United States Patent [19]

Katz

[11] Patent Number: 4,660,662

[45] Date of Patent: Apr. 28, 1987

[54] DIGITAL ELECTRONIC SCALE WITH STABILIZED DISPLAY

[75] Inventor: Gene I. Katz, Santa Rosa, Calif.

[73] Assignee: National Controls, Inc., Santa Rosa, Calif.

[21] Appl. No.: 774,755

[22] Filed: Sep. 11, 1985

[51] Int. Cl.[4] .................. G01G 19/52; G01G 23/10; G01L 25/00

[52] U.S. Cl. .................................. 177/50; 177/185; 73/1 B

[58] Field of Search .................. 177/185, 50; 364/734; 73/1 B

[56] References Cited

U.S. PATENT DOCUMENTS

| | | | |
|---|---|---|---|
| 3,937,943 | 2/1976 | Debrunner et al. | 364/734 X |
| 4,282,580 | 8/1981 | McGuire et al. | 364/734 |
| 4,310,893 | 1/1982 | Loshbough | 177/50 X |
| 4,467,881 | 8/1984 | Kitagawa | 177/50 |
| 4,535,857 | 8/1985 | Haze | 177/50 |
| 4,545,445 | 10/1985 | Naito | 177/50 X |
| 4,553,619 | 11/1985 | Fujinaga | 177/185 |

Primary Examiner—George H. Miller, Jr.
Attorney, Agent, or Firm—Flehr, Hohbach, Test, Albritton & Herbert

[57] ABSTRACT

System and method for providing a stable digital display of a value which fluctuates such as the input signal produced by a moving load on an electronic weighing scale. Digital readings are integrated over time, and the variations in the digital readings become insignificant compared to the sum of the readings in the historical average. Weight readings are automatically calibrated for span and linearization.

5 Claims, 3 Drawing Figures

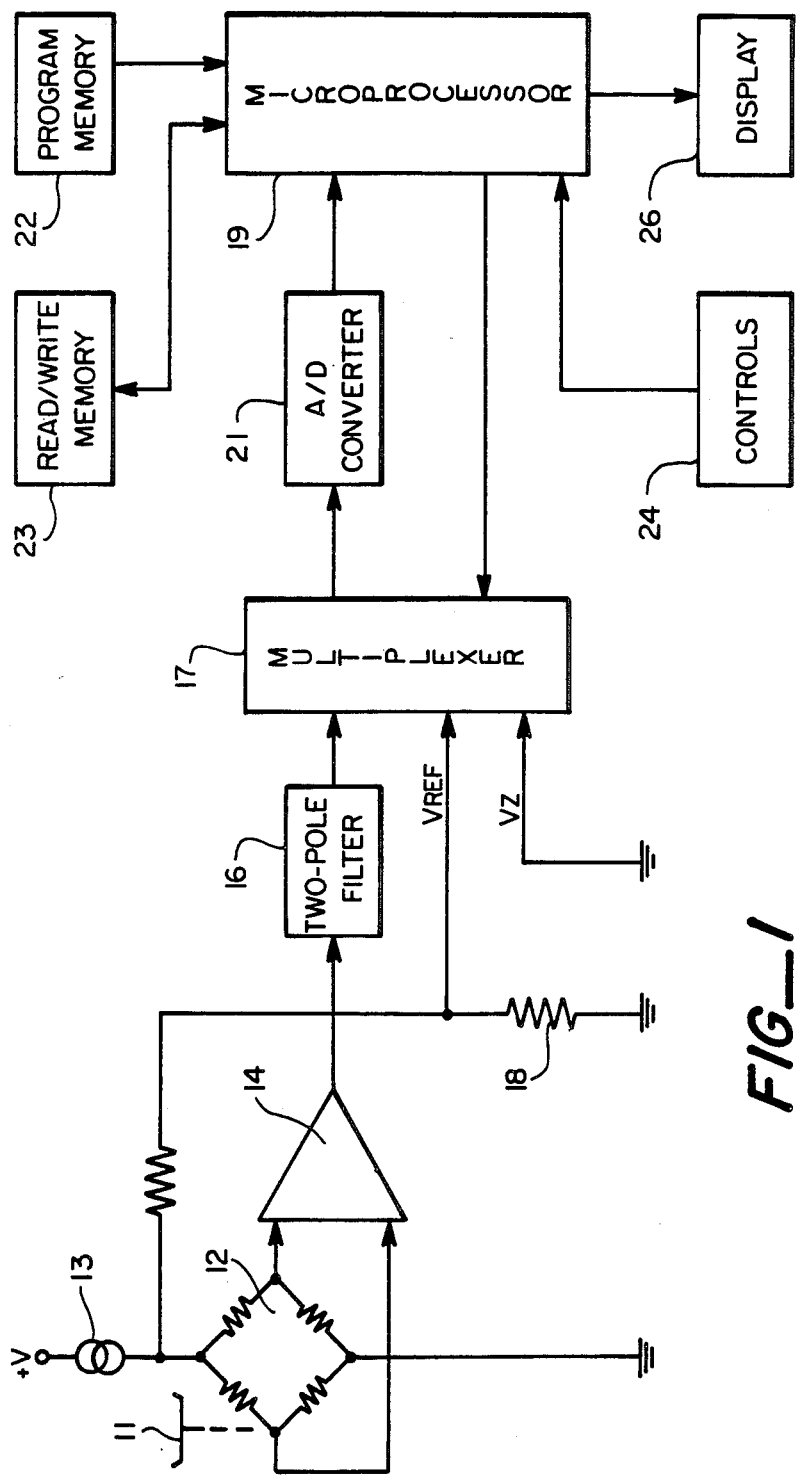
FIG_1

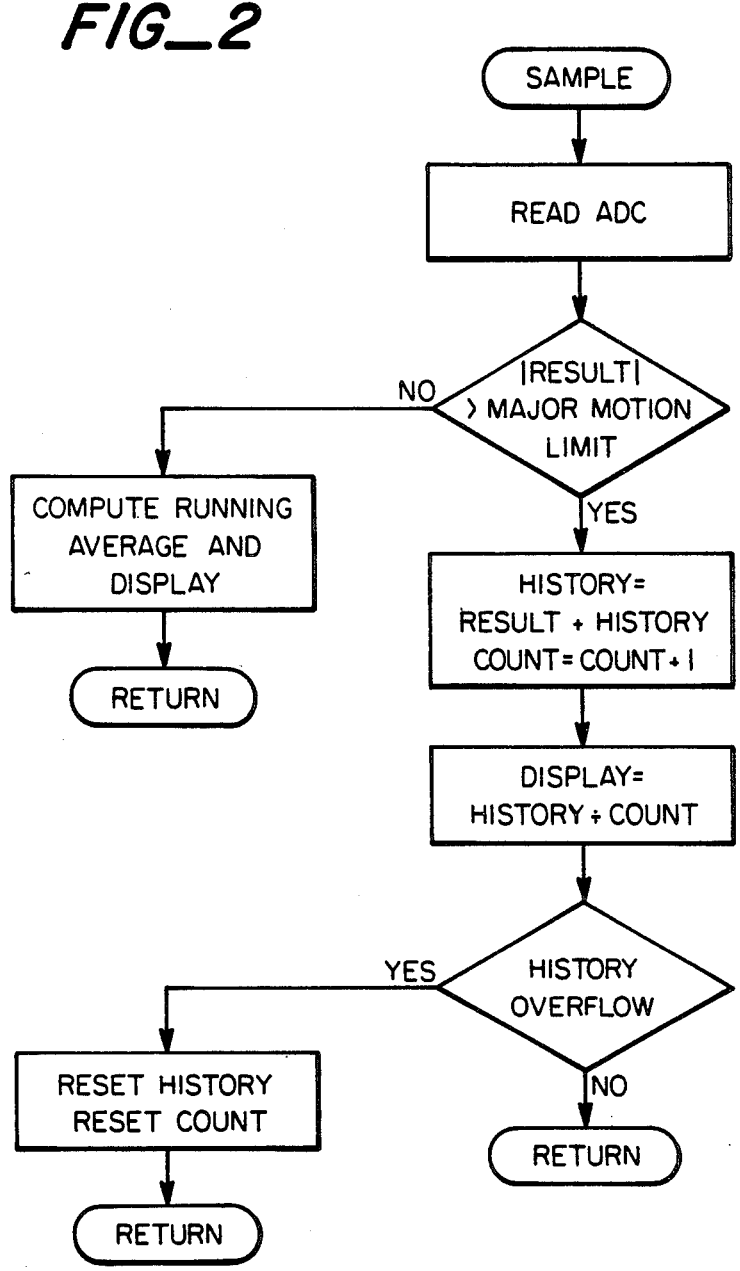
FIG_2

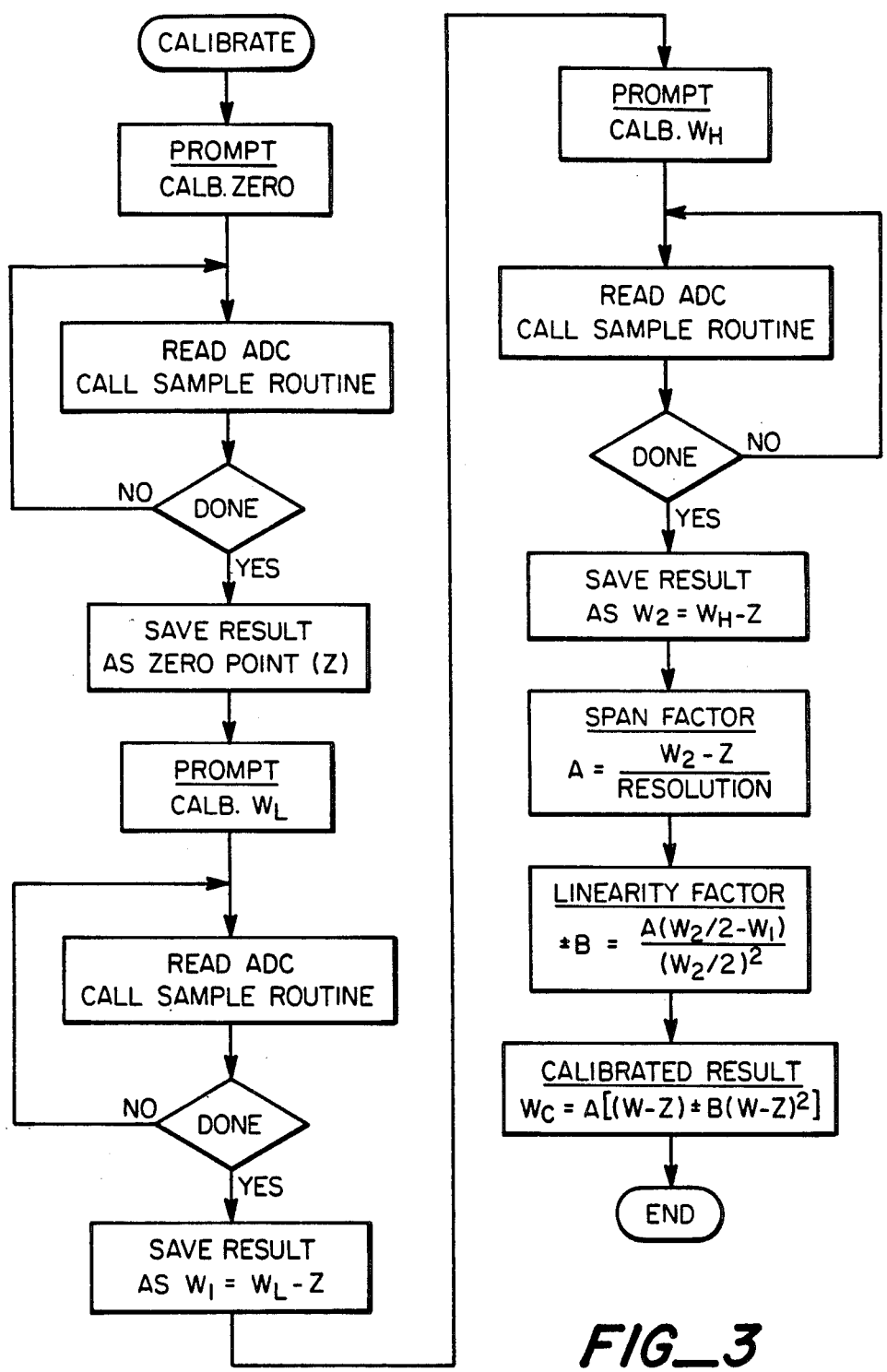
FIG_3

DIGITAL ELECTRONIC SCALE WITH STABILIZED DISPLAY

This invention pertains generally to electronic weighing scales, and more particularly to a system and method for processing an input signal to provide a stable digital display notwithstanding variations in the input signal.

With electronic scales and other devices with digital output displays, variations in the signal to be displayed can cause the readings of the display to vary in a manner which makes them difficult to read. This problem occurs, for example, in weighing babies or animals which will not remain in a stationary position long enough for a weight measurement to be made. The problem also occurs with scales which are subject to vibration and other noisy environments and scales for weighing moving loads such as conveyor belt scales. A similar problem also occurs in other equipment where unstable values are displayed digitally.

Scales heretofore provided for weighing moving loads have generally had slow response times which makes them difficult to use and unsuitable for use in some applications.

It is in general an object of the invention to provide a new and improved system and method for processing an input signal to provide a stable digital display notwithstanding variations in the input signal.

Another object of the invention is to provide a system and method of the above character which are particularly suitable for use in an electronic weighing scale.

Another object of the invention is to provide a system and method of the above character in which the weight readings of a scale are calibrated automatically for span and linearization.

These and other objects are achieved in accordance with the invention by periodically sampling the input signal and checking each sample to determine whether the input signal is varying by more than a predetermined amount. If the input signal is varying by less than a predetermined amount, the current sample is averaged with a predetermined number of recent samples to provide a running average of the input signal, and the running average is displayed as the value of the input signal. If the input signal is varying by more than the predetermined amount, the current sample is averaged with all previous samples for which the input signal varied by more than the predetermined amount to provide a historical average of the input signal, and the historical average is displayed as the value of the input signal. The readings of the scale are automatically calibrated for span and linearization.

FIG. 1 is a block diagram of one embodiment of a system according to the invention for processing the signal from the load cell of an electronic weighing scale to provide a stable digital display.

FIG. 2 is a flow chart illustrating the manner in which signals are processed to provide a stabilized digital display in the embodiment of FIG. 1.

FIG. 3 is a flow chart illustrating the manner in which weight readings are calibrated for span and linearization in the embodiment of FIG. 1.

In FIG. 1, the invention is illustrated in conjunction with a scale having a platform or other load receiving member 11 and a load cell 12 which provides an output signal corresponding to the load applied to the load receiving member. In the embodiment illustrated, the load cell is an electrical resistance strain gauge load cell which is energized by a signal from a source 13 and has strain dependent resistive elements connected in opposite arms of a bridge circuit. The output of the load cell is connected to the inputs of a fixed gain amplifier 14.

The signal from amplifier 14 is filtered by a two-pole filter 16 to eliminate high frequency disturbances, and the filtered signal is applied to one input of a multiplexer 17. A reference voltage $V_{REF}$ is developed across a resistor 18 and applied to a second input of the multiplexer, and a third input of the multiplexer is grounded to provide a zero reference voltage $V_z$. The multiplexer receives control signals from a microprocessor 19.

The output of the microprocessor is connected to the input of a high speed analog-to-digital converter 21 which converts the analog signals from the multiplexer to digital signals for processing by the microprocessor.

A program for controlling the operation of the microprocessor is stored in a program memory 22 and operating memory is provided by a read/write memory 23. In one presently preferred embodiment, memory 22 comprises a read-only memory, and memory 23 comprises a random access memory, but any other suitable types of memory can be employed, if desired. Input commands are applied to the system manually through input controls 24, which can be of any suitable type such as pushbutton switches or a keyboard. A digital display 26 is driven by the microprocessor to provide output readings.

As illustrated in FIG. 2, the input signal from analog-to-digital converter 21 is sampled periodically and compared with a major motion limit to determine whether the signal is varying by more than a predetermined amount. If the variation is less than the major motion limit, the current sample is averaged with a predetermined number (e.g., 4, 8 or 10) of the most recent samples to provide a running average of the input signal. If the variation in the input signal is greater than the major motion limit, the current sample is added to the sum of all previous samples which exceeded the major motion limit, and the resulting sum is stored in an accumulator. Each time a new sample is added to the total in the accumulator, a counter is incremented, and the sum in the accumulator is divided by the count in the counter to provide a historical average of the input signal. When the input signal is less than the major motion limit, the running average is displayed, and when the input signal exceeds the major motion limit, the historical average is displayed. If the accumulator should overflow, the accumulator and the counter are reset, and the process continues.

The number of samples which are added together increases indefinitely, limited only by the size of the memory. As the number of readings increases, variations in the input signal become increasingly less significant compared to the total in the accumulator, and they tend to be swamped out. This provides an output reading on the digital display which is highly stable and substantially free of fluctuations notwithstanding variations in the input signal.

Means is also provided for automatically calibrating the system to compensate for the span and linearization of the load cell and the electronic components employed in the scale. As illustrated in FIG. 3, during an initial calibration routine, readings are taken with no load and with loads of two known weights on the load receiving member of the scale. The test weights can be of any suitable size, and in one presently preferred embodiment, they are chosen to be toward the center and the upper end of the scale's capacity. Thus, for example, with a scale having a capacity of 20 pounds, test weights of 10 and 20 pounds can be employed. The operator is prompted to place the test weights on the load receiving member. The stabilized no load reading is stored as the zero-point value Z. The reading for the smaller of the two known weights is stored as the value $W_1$, where $W_1 = W_L - Z$, and $W_L$ is the stabilized reading for the smaller weight. The reading for the larger of the known weights is stored as the value $W_2$, where $W_2 = W_H - Z$, and $W_H$ is the stabilized reading for the larger weight.

A span factor A and a linearization factor B for the scale are calculated from the test point readings according to the following relationships:

$$A = \frac{W_2 - Z}{R},$$

$$\pm B = \frac{A\left(\frac{W_2}{2} - W_1\right)}{\left(\frac{W_2}{2}\right)^2}.$$

These factors are stored, and thereafter each time a weight measurement is made, the reading is calibrated in accordance with the relationship $$W_c = A[(W-Z) \pm B(W-Z)^2],$$

where $W_c$ is the calibrated weight reading and W is the input signal produced by the load to be weighed.

The invention has a number of important features and advantages. It provides a stable digital display of a quantity which may be moving or shifting in a manner which would otherwise make the display difficult to read, and it does so in a relatively short time. The digital readings are repeatable and provide a more accurate indication of the true value of the measured quantity than would a series of individual digital readings. Digital span and linearization are established automatically during a calibration sequence, and the use of two known weights at prompted times permits the points of reference for the calibration sequence to be determined automatically. This method of calibration is easier to carry out and more accurate than manual calibration methods. While the invention has been described with specific reference to an electronic weighing scale, it is also applicable to other units of measure and to the display of digital signals in general.

It is apparent from the foregoing that a new and improved system and method for processing an input signal to provide a stable digital display have been provided. While only certain presently preferred embodiments have been described in detail, as will be apparent to those familiar with the art, certain changes and modifications can be made without departing from the scope of the invention as defined by the following claims.

I claim:

1. In a method of determining the weight of a moving load on the load receiving member of a scale, the steps of: providing an input signal corresponding to the weight of the load; periodically sampling the input signal; checking each sample to determine whether the input signal is varying by more than a predetermined amount; if the input signal is varying by less than the predetermined amount, averaging the current sample with a predetermined number of previous samples to provide a running average of the input signal, and displaying the running average; if the input signal is varying by more than the predetermined amount, averaging the current sample with all previous samples for which the input signal varied by more than the predetermined amount to provide a historical average of the input signal, displaying the historical average, placing two loads of known weight on the load receiving member, combining the input signals produced by a zero load and the two loads of known weight to determine span and linearity factors for the scale, and combining the span and linearity factors with the input signal produced by a load to be weighted to provide a calibrated weight signal.

2. In a scale for weighing a moving load: a load receiving member, means including a load cell connected to the load receiving member for providing an input signal corresponding to the weight of the load, means for checking the input signal to determine whether the input signal is varying by more than a predetermined amount, means active when the input signal is varying by less than the predetermined amount for averaging the current value of the input signal with a predetermined number of previous values to provide a running average of the input signal, means active when the input signal is varying by more than the predetermined amount for averaging the current value of the input signal with all previous values for which the input signal varied by more than the predetermined amount to provide a historical average of the input signal, display means for displaying the running average when the input signal is varying by less than the predetermined amount and displaying the historical average when the input signal is varying by more than the predetermined amount, and calibration means responsive to the input signals produced by a zero load and two loads of known weight on the load receiving member for determining span and linearity factors for the scale and combining the span and linearity factors with the input signal produced by the load to be weighed to provide a calibrated weight signal.

3. The scale of claim 2 wherein the span factor is determined by the relationship $$A = \frac{W_2 - Z}{R},$$

where A is the span factor, $W_2$ is the input signal produced by the greater load of known weight, Z is the zero load input signal, and R is the resolution of the scale; the linearity factor is determined by the relationship $$\pm B = \frac{A\left(\frac{W_2}{2} - W_1\right)}{\left(\frac{W_2}{2}\right)^2},$$

where B is the linearity factor and $W_1$ is the input signal produced by the smaller load of known weight; and the calibrated weight signal is determined by the relationship $$W_c = A[(W-Z) \pm B(W-Z)^2],$$

where $W_c$ is the calibrated weight signal and W is the input signal produced by the load to be weighed.

4. In a scale of weighing a load: a load receiving member, means including a load cell connected to the load receiving member for providing an input signal corresponding to the weight of the load, calibration means responsive to the input signals produced by a zero load and two loads of known weight on the load receiving member for determining span and linearity factors for the scale and combining the span and linearity factors with the input signal produced by the load to be weighed to provide a calibrated weight signal, and display means responsive to the calibrated weight signal for indicating the weight of the load.

5. The scale of claim 4 wherein the span factor is determined by the relationship $$A = \frac{W_2 - Z}{R}.$$

where A is the span factor, $W_2$ is the input signal produced by the greater load of known weight, Z is the zero load input signal, and R is the resolution of the scale; the linearity factor is determined by the relationship $$\pm B = \frac{A\left(\frac{W_2}{2} - W_1\right)}{\left(\frac{W_2}{2}\right)^2}.$$

where B is the linearity factor and $W_1$ is the input signal produced by the smaller load of known weight; and the calibrated weight signal is determined by the relationship $$W_c = A[(W-Z) \pm B(W-Z)^2],$$

where $W_c$ is the calibrated weight signal and W is the input signal produced by the load to be weighed.

* * * * *